Sept. 5, 1967  R. L. ASHBY  3,339,284
MODEL TRIMMING GUIDE
Filed Sept. 24, 1963  3 Sheets-Sheet 1
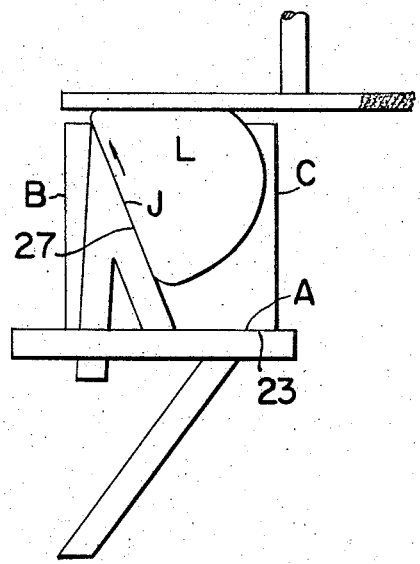
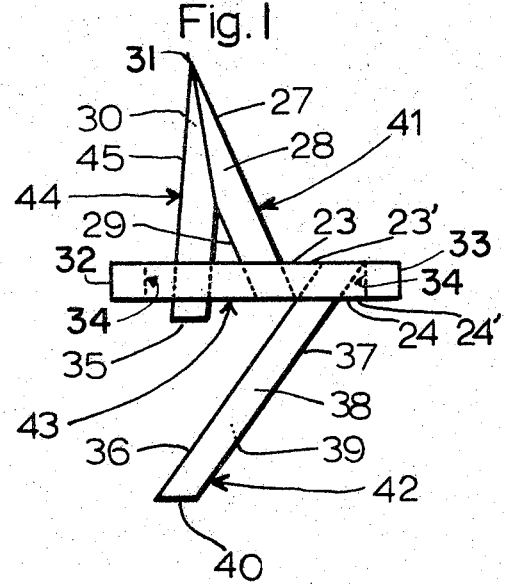
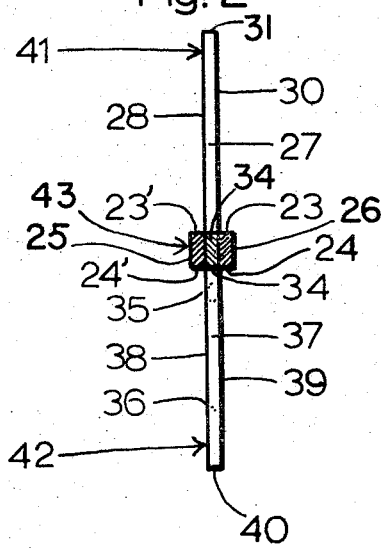
Richard L. Ashby  INVENTOR.

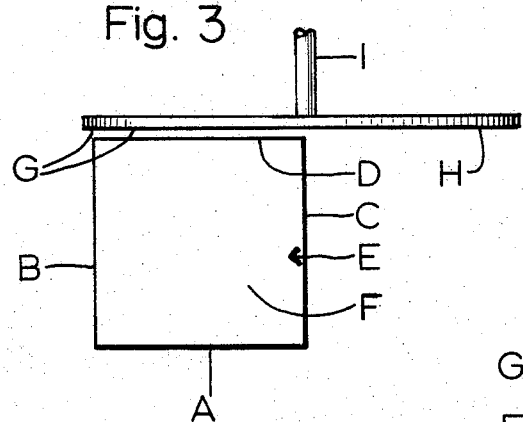
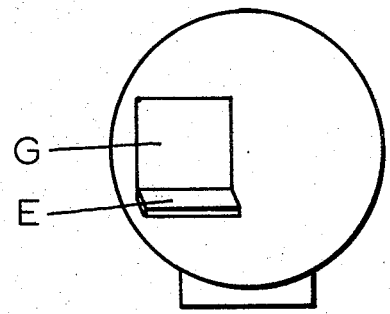
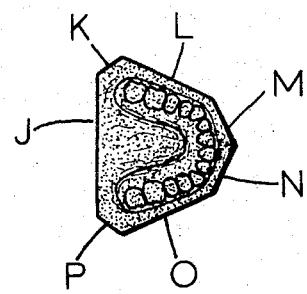
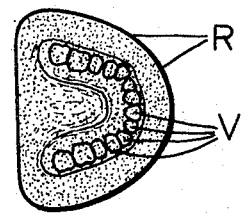
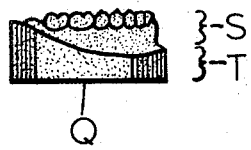

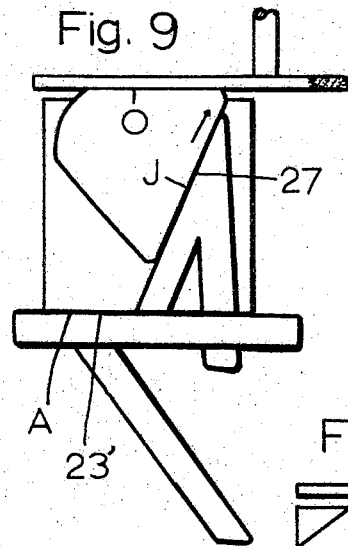
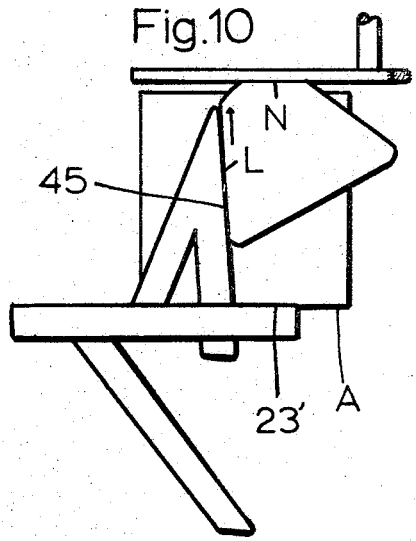
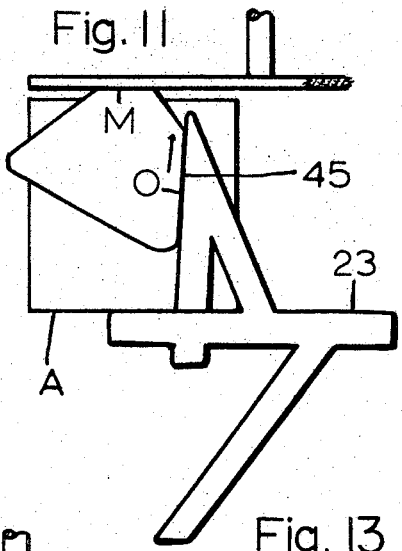
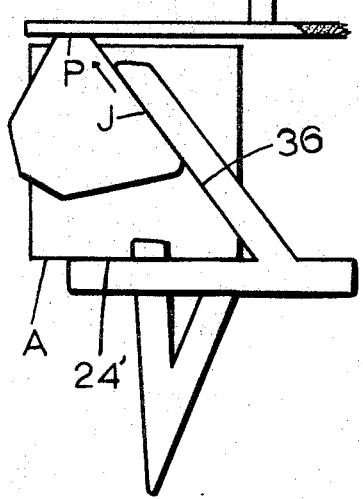
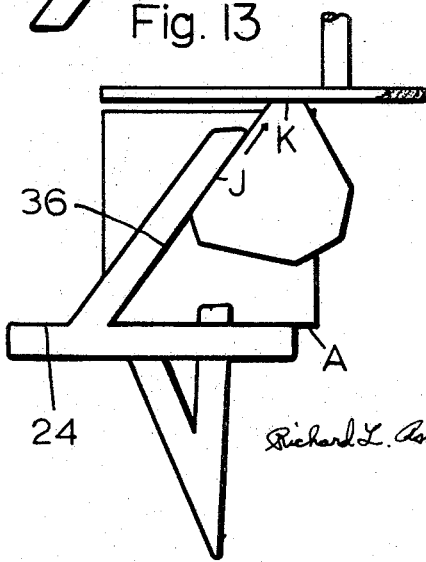

United States Patent Office 3,339,284
Patented Sept. 5, 1967

3,339,284
MODEL TRIMMING GUIDE
Richard L. Ashby, Pittsburgh, Pa.
(290 Crestmont Drive, Oakland, Calif. 94619)
Filed Sept. 24, 1963, Ser. No. 311,026
5 Claims. (Cl. 32—38)

The present invention relates generally to dental devices and to devices for forming, shaping, grinding, or polishing objects possessing certain types of shapes and forms, not necessarily limited to symmetrical objects but sometimes possessing bilateral symmetry, such as the base of orthodontic dental models, or casts, or any other orders of symmetry; and to means and methods of forming the same; and more particularly to a model trimming guide, the device for and methods of shaping the base or art portion of the dental casts used in orthodontics and other phases of dentistry.

This present novel model trimming guide and the novel methods of employing them to grind the base or art portion of the dental cast afford an efficient and accurate instrument for and method of trimming the base of the dental cast, especially those casts of the teeth and related structures used at present in the field of orthodontics; which instrument is radically different from anything heretofore found in the dental art.

This guide assists in the correct positioning of the dental cast and its base portion to the model trimmer; the uniqueness, and newness of which will be readily apparent.

In the present state of the art, side surface grinders are generally used similar to the one illustrated in FIGURE 6. The model or cast, FIGURE 7, is trimmed on the bottom, Q of FIGURE 9, and then on the back surface, J of FIGURE 8. The rest of the surfaces as shown by K, L, M, N, O, P, of FIGURE 8 are then usually trimmed by following lines inscribed on the grinding rest plate, E of FIGURES 5 and 6; or by the use of adjustable protractors used in conjunction with the grinding rest plate to guide the model against the grinding surface.

The first of the above mentioned methods is highly inaccurate and time consuming because water and ground plaster cover the grinding rest plate during the process and obscure the guide lines; and the grinding itself tends to move the model in undesirable ways resulting in inaccurate grinding.

The second of the above mentioned methods while being more accurate is also very time consuming because each angle must be set in turn. This usually requires the setting of at least six angles to trim a single upper model base: and with the constant changing of the angle there is an increased probability that the wrong angle may be set and the model spoiled. Also the end of the guide is close to the grinder only for angles close to 90°. This increases the inaccuracy of trimming low degree angles especially when the guiding side of the model being trimmed is short.

A third method attempts to eliminate grinding and trimming altogether by joining the cast of the teeth with properly shaped base made in one of several methods, usually made by pouring plaster into a plastic or rubber form. In this method there are difficulties involved in correctly positioning the teeth in relation to the base. This becomes especially true when both upper and lower casts are considered as a unit. Also there is the additional cost of the plastic or rubber base, and the limitation to a few standard sizes.

These past methods made it difficult to train assistants rapidly in the correct procedure, and because of the time consuming aspects and the poor results of the past, many orthodontists, and other dentists who desired nice looking models, have been sending them to commercial laboratories.

Ideally the teeth should be centered on a bilaterally symmetrical shaped base.

The present invention solves all of the above problems in the best method brought forth so far.

As I describe the various parts of the above mentioned model trimming guide, and its interaction with the model trimmer, the grinding rest plate, and the model being trimmed; it will be seen that a new and useful invention has been created along with a manner and method for its use.

Referring now to the accompanying drawings, which form a part of this application:

FIGURE 1 is a plan view of a preferred form.

FIGURE 2 is an end view of the model trimming guide shown in FIGURE 1.

Referring to FIGURES 1 and 2 the various parts are: guide arm 41, with sides 27, 28, 29, 30, and end 31; attached rigidly to the body 43, with sides 25, 26, 23, 23', 24, and 24'. Note that sides or surfaces 23' and 24' may or may not be parallel or in the same plane to sides 23 and 24 respectively. Body ends are 32 and 33 with nonfunctional fillers 34, in the type of construction shown. Sides or edges 27 and 29 are usually parallel as are also sides or edges 28 and 30.

Referring to FIGURES 3 and 4 it will be seen that this model trimming guide has arms 42 and 44: Of which arm 44 extends through the body 43, as a short arm 35, which in this particular style of construction, is for the purpose of balance as when arm 42 of the model trimming guide rests on the grinding rest plate. In other types of construction arms 41 and 44 may form a single arm or completely separated arms. Arm 44 has side or edge 45. For most purposes arm 44 may be considered a part of arm 41.

Arm 42 has edges or sides 36, 37, 38, and 39, with end 40.

FIGURE 3 shows the usual relationship between the grinding rest plate, and the side of the grinding wheel, of a model trimmer in which I is the motor shaft or its extension, H the wheel with grinding surface G: and E is the grinding rest plate with top surface F, and sides A, B, C, and D.

FIGURE 4 shows front view of a model trimmer and the relation of G to E.

FIGURE 5 shows a plaster cast of some upper teeth V, as it is usually poured and set, ready for the trimming of the art or base portion; in which R is the untrimmed peripheral portion.

FIGURE 6 shows the same model as FIGURE 5 after the base or art portion has been trimmed: and having a back surface J, two heel surfaces K and P, two side surfaces L and O, and two face surfaces M and N.

FIGURE 7 shows the same model shown in FIGURE 6 but is a side elevation showing in addition the bottom surface Q, the anatomical portion S, and the base or art portion T.

FIGURES 8 through 13 show a possible sequence for trimming an upper dental model using the model trimming guide shown in FIGURES 1 and 2.

FIGURE 8 shows a model to be trimmed with surface J contacting 27, and 23 contacting A for the formation of side L of the model.

FIGURE 9 shows the same model as above with surface J contacting 27, and 23' contacting A for the formation of side O of the model.

FIGURE 10 shows the same model above with surface L contacting 45, and 23' contacting A for the formation of N.

FIGURE 11 shows the same model above with surface

O contacting 45, and 23 contacting A for the formation of M.

FIGURE 12 shows the same model above with surface J contacting 36, and 24' contacting A for the formation of side P of the model.

FIGURE 13 shows the same model above with surface J contacting 36, and 24 contacting A for the formation of side K of the model.

It is to be understood that other sequences are possible in keeping with the spirit of this invention.

It is also to be understood that trimming a lower model would proceed in a similar manner except perhaps for surfaces M and N which most operators prefer to combine as a segment of an arc.

While I have shown only one preferred form of my invention it is to be understood that the present invention may be quite varied. The method of use will also vary according to the particular model trimming guide, the shape of the grinding rest plate, and the shape and symmetry, if any, of the object being formed.

It is also to be understood that there may be constructed in many of the conventional methods, such as by riveting pieces together, cementing, by casting, stamping, forging etc. Also many materials could be used, the main ones being metals and plastics.

In general when the model trimming guide is set to trim a particular side or angle there are usually two edges involved at a given time: one which relates the model trimming guide to the model trimmer through the grinding rest plate, and one which relates the model being trimmed to the other above mentioned edge, and through it to the grinding rest plate, usually in a horizontal direction. At the same time the grinding rest plate acts as a guide in the usual vertical direction for both the model trimming guide and the model being trimmed. When set to trim a different side of a model, a different combination of two edges comes into use to relate the grinding rest plate, the model being ground, and the model trimming guide in a similar manner.

Some of the unique features which make this model trimming guide a new invention are:

The insight that all seven angles could be cut using just one guide with preset angles.

The insight of making the model trimming guide capable of being inverted for achieving the bilaterally symmetrical shape of the model base. This had not been done before in dentistry and is one of the main features of the model trimming guide which has made it practical.

It is to be realized that the order in which sides K, L, M, N, O, P, of FIGURE 6 are cut can differ in sequence from the sequences as given in the explanation or the figures. However sides Q and J, see FIGURES 6 and 7 are generally cut in the usual manner, in that order, and preceed the other sides.

The model trimming guide shown in FIGURES 1 and 2 is the preferred form for use with model trimmers capable of using only edge A of the grinding rest plate, as shown in FIGURES 8 through 13.

While I have shown only one preferred form of my invention, it should be understood that various changes or modifications can be made within the scope of the claims hereto attached, without departing from the spirit of the invention.

Having thus described my invention and the manner of its use what I claim is as follows:

1. A model trimming guide comprising a body portion which is approximately of rectangular cross section and having a length greater than its width and having its longitudinal sides parallel to each other to engage a side of the grinding rest plate of a model trimmer and three arms of uniform width and thickness having parallel sides and edges, the thickness of each being less than the thickness of the body portion, extending from said body portion and forming angles therewith, two of said arms extending on one transverse side of said body portion and forming an angle other than a right angle and substantially a right angle therewith respectively, the other arm extending from said body portion on the opposite transverse side and forming an angle therewith other than a right angle.

2. A model trimming guide according to claim 1 wherein said two arms on one transverse side of said body portion are joined at their end portions to form a triangular section.

3. A model trimming guide according to claim 1 wherein said arms are rigidly fixed to said body portion.

4. A model trimming guide according to claim 1 wherein said substantial right angle is slightly greater than 90°.

5. A model trimming guide according to claim 1 wherein said arm that forms substantially a right angle with said body portion has an extension arm protruding from the opposite side of the body portion.

References Cited

UNITED STATES PATENTS

| | | | |
|---|---|---|---|
| 244,754 | 7/1881 | Kirkham | 33—103 |
| 1,331,302 | 2/1920 | Wickham | 32—38 |
| 2,858,612 | 11/1958 | Verrett | 32—104 |

RICHARD A. GAUDET, *Primary Examiner.*

J. W. HINEY, *Assistant Examiner.*